United States Patent Office 2,874,175
Patented Feb. 17, 1959

2,874,175

PROCESS FOR MAKING FATTY ACID DIGLYCERIDE, DIESTERS OF DIBASIC ACIDS

Reuben O. Feuge and Truman L. Ward, New Orleans, La., assignors to the United States of America as represented by the Secretary of Agriculture No Drawing. Application October 4, 1955
Serial No. 538,539

5 Claims. (Cl. 260—404.8)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to glycerides in which two molecules of a fatty acid diglyceride are joined in the form of a diester of a straight-chain aliphatic dicarboxylic acid and to processes for their preparation. Each component of these glycerides (glycerol, fatty acids, and the specified dibasic acids) have been demonstrated to be digestible materials that cause no pronounced adverse physiological reaction.

In the utilizaiton of ordinary fats and oils it is universally recognized that the values for the various physical properties of these products range between certain limits.

Melting points range from below 0° F. to well above 100° F. The upper limit for the melting point of natural, edible glyceride fats, even after complete hydrogenation, is about 163° F., which is the melting point of tristearin. Saturated fatty acids of chain lengths longer than stearic, which could form triglycerides melting above 163° F., occur only to a limited degree in natural fats and oils. While it is possible to prepare edible fats having somewhat higher melting points by converting a high-melting natural fat to di- and monoglycerides, the final products are surface active and exhibit a pronounced tendency to decompose on being heated. The upper limit of the melting point of triglycerides converted to mono- and diglycerides is about 179° F., the melting point of 1-monostearin.

Probably no natural fat or oil melts below −11.6° F., the melting point of trilinolenin. Associated with these low melting points is a high degree of unsaturation; that is, the fatty acids combined as the glycerides are largely polyunsaturated. Consequently, these oils oxidize, polymerize, and undergo other deteriorative reactions with relative ease. While some economically important oils melt at low temperatures, most melt at relatively high temperatures. For example, cottonseed oil normally does not melt completely at 55° F., even though its iodine value is above 100 and the content of the linoleoyl group is over 40%.

The viscosity of ordinary fats and oils, another physical property of great technical importance, likewise falls between definitely fixed limits. At 210° F. it ranges from about 7.1 centistokes for sardine oil to 10.3 centistokes for rapeseed oil, while at this temperature cottonseed and soybean oils possess viscosities of about 8.4 and 7.6 centistokes, respectively. Castor oil is the only natural oil possessing a viscosity appreciably above this range; its viscosity is about 20.1 centistokes at 210° F., about double that for other vegetable oils. However, castor oil is not a food fat. For food uses oils having a viscosity greater than about 10 centistokes at 210° F. have heretofore not been available.

A primary object of the present invention is to provide novel diglyceride diesters or "new fats," which are adapted for use in and on food preparations, and which can feasibly be produced, in the form of substantially pure compounds or components of mixed glycerides, from natural fats and oils. Another object is to provide such diglyceride diesters which, in their liquid form, have an exceptionally high viscosity in comparison with edible glyceride fats. Another object is to provide such diglyceride diesters which are normally solid materials that have both an exceptionally high melting point and a pronounced tendency to crystallize in the form of glossy solids composed of long needle-like crystals. A further object is to provide such diglyceride diesters which are viscous normally liquid materials that have a very low freezing point and a strong tendency to resist crystallization even from a solvent solution.

The diglyceride diesters provided by this invention have the general formula:

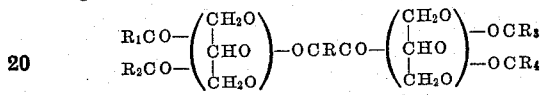

in which R represents a straight-chain, aliphatic, saturated or monoolefinic, divalent hydrocarbon radical containing from 2 to 8 carbon atoms, that is, it is derived from a straight-chain, aliphatic, dicarboxylic acid containing from 4 to 10 carbon atoms, preferably from 4 to 6 carbon atoms, and may be a saturated dicarboxylic acid, such as adipic acid, or a monoolefinic dicarboxylic acid, such as fumaric acid. $R_1$, $R_2$, $R_3$, and $R_4$ are long-chain, aliphatic, hydrocarbon radicals containing from 11 to 21 carbon atoms, that is, they are derived from long-chain, aliphatic, monobasic fatty acids containing from 12 to 22 carbon atoms (the naturally occurring fatty acids), and may be saturated, such as stearic acid, or unsaturated, such as oleic acid. Although $R_1$, $R_2$, $R_3$, and $R_4$ may be different from each other, it is preferred that they all be identical, particularly heptadecyl derived from stearic acid and heptadecenyl derived from oleic acid. It is preferred, further, that the acyl groups of which these radicals form a part, be attached in the 1,3-positions of the glycerol molecule. In general, these diglyceride diesters exhibit the lubricating properties inherent in glycerol esters of long chain aliphatic acids, and are useful wherever a long chain aliphatic acid ester of glycerol is useful.

The dibasic acid which joins two molecules of the fatty acid diglycerides may contain from 4 to 10 carbon atoms. In general, the unique properties of the diglyceride diesters provided by this invention are manifested most strongly when the dibasic acid contains not more than half as many carbon atoms as the longest-chain fatty acid that esterifies the diglyceride molecules joined by the dibasic acid. Illustrative examples of suitable dibasic acids include acetylene dicarboxylic, fumaric, succinic, glutaconic, glutaric, muconic, adipic, pimelic, suberic, azelaic, sebacic, and the like acids. The use of saturated or monoolefinic acids containing from 4 to 6 carbon atoms is preferred.

The fatty acid with which each of the glycerol molecules are diesterified can be one or more of the saturated or unsaturated long-chain fatty acids that occur in the natural oil-bearing materials such as cottonseed, peanuts, soybeans, animal fats, and the like. Illustrative examples of suitable fatty acids include stearic, palmitic, oleic, linoleic, myristic, capric, behenic, and the like acids.

The diglyceride diesters provided by this invention can be prepared by a variety of procedures. In the preferred procedure a diglyceride is dissolved in a suitable solvent (such as chloroform), and in the presence of an organic base (like pyridine) the dichloride of the dibasic acid, dissolved in a solvent, is slowly added in an amount about equivalent to the diglyceride present. After standing at room temperature for several days, or after heating at about 150° F. for several hours, preferably at about 50° C. until the reaction is substantially complete, the solution is washed successively with a dilute, aqueous solution of mineral acid and water. Finally, the solvent is removed from the reaction product, for example, by evaporation and stripping. If desired, the reaction product can be purified further by fractional crystallization from solvents, or by refining and bleaching in the manner in which these operations are performed with ordinary fats and oils.

In another method of preparation, glycerol dichlorohydrin is esterified with the dibasic acid in the presence of a suitable catalyst (such as stannous chloride or sulfuric acid) and the resulting tetrahydroxy diester is reacted with alkali metal salts of the fatty acids to be incorporated in the finished product.

A technical grade product of the new type fats can be prepared by esterifying diglycerides with a dibasic acid in the presence of an esterification catalyst (such as zinc or stannous chloride).

Those of the diglyceride diesters provided by this invention which are saturated fatty acid diglyceride diesters in which the saturated fatty acid contains 16 or more carbon atoms exhibit an exceptionally high melting point and a strong tendency to crystallize in a single morphological form. And, this is true, whether the dibasic acid that joins the glycerol molecules is saturated or unsaturated. For example, when 1,3-distearin (melting point, 172.8° F.) was combined with succinic acid, the resulting bis(glycerol 1,3-distearate) succinate had a melting point of 194.0° F. Bis(glycerol 1,3(distearate) adipate was found to possess a melting point of 178.5° F. These melting points are far above those of ordinary triglycerides and make the new-type fats desirable ingredients of plastic fat products (consisting of liquid oils and solid fats) for which a long plastic range is desired. The new-type fats also solidified to hard glossy solids, which makes them desirable for use in polishing compositions and for imparting gloss to surfaces. The combination of high melting point, gloss, and hardness permits the compounds to replace carnauba wax (melting point, about 182.1° F.) and other vegetable waxes, particularly in uses like the polishing of candy surfaces.

The crystal habits of these saturated fatty acid diglyceride diesters are unique and unexpected. Their behavior during the cooling of the melts and crystals at various rates followed by slow heating to the melting point indicates that each of these compounds tend to be relatively resistant to polymorphic transformations; a characteristic which is much desired in plastic fats, coating compositions, and polishes. When mono-, di-, and triglycerides of the saturated fatty acids are examined under conditions such as those used with the new-type fats, each compound is found to possess several melting points and to undergo extensive polymorphic transformations. Photomicrographs of crystals obtained by crystallization of the new-type fats from solvents revealed unique and unexpected features. The crystals were long and needle-like in structure, and their length was more than 50 times the diameter of the crystal. Masses of the crystals possessed an asbestos-like structure, and comparatively small amounts were able to entrap large amounts of solvents. Removal of the solvent by filtration under vacuum produced a paper-like mat of the crystals. To entrap an equal amount of solvent under the same conditions, the amount of ordinary, solid fats was about 3 times greater than that required for the new-type fats. The ordinary fats came out of solution in the form of granules or relatively block-like crystals. These new-type fats are uniquely adapted for use as stiffening agents in plastic fats and other products where it is desired to entrap a liquid component.

On the other hand, those of the diglyceride diesters provided by this invention which are unsaturated fatty acid diglyceride diesters in which the coupled glycerol molecules are diglycerides of an unsaturated fatty acid of about 18 carbon atoms, exhibit a strong tendency to resist crystallization. And, this is true, whether the dibasic acid that joins the glycerol molecules is saturated or unsaturated. For some unexplained reason these diglyceride diesters can be crystallized only with difficulty, though probably the behavior is a reflection of structural configuration and steric hindrances. Some of them crystallized only after being kept below their melting point for a period of several days. Others could not be made to crystallize under the usual conditions. On being cooled below −10° F., the latter products simply become more viscous, and on being held for several weeks at −10° F. no crystals appeared. When the products were mixed with solvents like acetone and commercial hexane (one part of product to about five or six parts of solvent, by weight) and cooled to −112° F., no crystals formed. These new fats are uniquely adapted for use as ingredients of low-temperature lubricants, both edible and inedible, as components of plastic fat mixtures, as plasticizers for several types of resins, and in general wherever there is required a stable oil product of a relatively low degree of unsaturation and which will not crystallize.

Whether the fatty acids contained in the diglyceride diesters provided by this invention are saturated or unsaturated, the diglyceride diesters exhibit an exceptionally high viscosity. Viscosity determinations showed that at 210° F. the compounds bis(glycerol 1,3-distearate) fumarate, -succinate, and -adipate had viscosities of 11.4, 18.9, and 17.9 centistokes, respectively. And, at 100° F. the viscosities for bis(glycerol 1,3-dioleate) fumarate, bis(glycerol 1,3-dioleate) succinate, and (bis(glycerol 1,3-dioleate) adipate were 85.5, 77.0 and 92.0 centistokes, respectively. The fact that whether the fatty acid acyls are saturated or unsaturated the diglyceride diesters provided by this invention retain their property of forming highly viscous liquids makes it possible to prepare such liquids having either high or low melting points and freezing points by varying the proportion of saturated to unsaturated fatty acids that are combined to form the compounds.

The following examples are illustrative of the details of at least one method of practicing this invention.

*Example 1*

1,3-distearin was prepared from purified stearic acid obtained by repeated crystallization from acetone of a commercial stearic acid, which originally had a purity of about 97%. The purified acid was converted into a mixture of mono-, di-, and tristearin under conditions which favored the formation of distearin. Briefly, 400 g. (1.41 moles) of stearic acid, 49.6 g. (0.538 mole) of glycerol in the form of the U. S. P. product, and 0.72 g. (0.0032 mole) of stannous chloride dihydrate were mixed for 3 hours at 200° C. while under hydrogen at a pressure of 20 mm. of mercury. Water was removed as it was formed. The reaction product, after washing with water to remove the uncombined glycerol, was subjected to repeated crystallizations from a solution of 70% isopropyl alcohol and 30% water followed by repeated crystallizations from n-hexane. The final 1,3-distearin product contained no monoglycerides and only a minor proportion of tristearin. The latter was found not to interfere with the subsequent preparation and purification of the dibasic acid esters.

To 160 g. (0.256 mole) of moisture free distearin kept under an atmosphere of dry nitrogen there was added 640 g. of chloroform and the mixture was heated to dissolve the distearin, after which the solution was cooled to about 30° C. Then 19.80 g. (0.250 mole) of pyridine was added. A solution consisting of 19.91 g. (0.1088 mole) of adipyl chloride and 50 g. of chloroform was added dropwise to the distearin solution while the latter was stirred constantly. The following day the temperature was increased to 50° C. and held at this level for 8 hours. On succeeding days the temperature was maintained at 50° C. until the total time at this temperature was 30 hours. The reaction product then was purified.

In the purification the reaction product-chloroform solution was first washed with a 0.25 N hydrochloric acid solution and then with water, after which the chloroform was removed by stripping with hydrogen or nitrogen below atmospheric pressure and at about 100° C. Further purification consisted of repeated crystallizations from n-hexane and from acetone.

*Example 2*

The 1,3-diolein was obtained by repeatedly crystallizing from acetone a product originally containing about 85% of diolein, the other components being mono-olein and triolein. The diolein product was one of the fractions obtained on a molecular distillation of a mixture of mono-, di-, and trioleins. This mixture was obtained in turn by allowing methyl oleate (purity, about 98%) and glycerol to react in the presence of a small amount of sodium hydroxide (0.1% based on the weight of methyl oleate) for about 15 minutes at 250° C. and then removing the soap and uncombined glycerol. The purified 1,3-diolein possessed the theoretical iodine value, a hydroxyl value of 86.0 (theoretical hydroxyl value, 90.3), and contained no monoglyceride according to the periodic acid method of analysis.

To 120.8 g. (0.192 mole) of moisture free diolein kept under an atmosphere of dry nitrogen there was added 960 g. of chloroform and the diolein was dissolved by swirling the chloroform, after which the solution was cooled to approximately room temperature. 14.68 g. (0.096 mole) of fumaryl chloride was diluted with chloroform to a volume of 50 ml., placed in a burette, and protected from atmospheric moisture by a drying tube. A chloroform solution 50 ml. in volume and containing 28.5 g. (0.221 mole) of quinoline was placed in a similar burette and likewise protected from atmospheric moisture. Both burettes were sealed to the flask containing the distearin solution. While the distearin solution was being continuously agitated with a mechanical stirrer, the solutions of fumaryl chloride and quinoline were added dropwise over a period of about 2 hours and in such a way that the total amount of quinoline (not the volume of quinoline-chloroform solution) added to the distearin solution was always equivalent to slightly more than the total amount of fumaryl chloride which had been added. After all of the fumaryl chloride solution was in the reaction flask, the remainder or excess of the quinoline solution was added. In the course of the following 4 days the reactants were kept at 50° C. for a total of 16 hours, the remainder of the time being at room temperature, 26° C. The reaction product then was purified.

In the purification the reaction product-chloroform solution was first washed with a 0.25 N hydrochloric acid solution and then with water, after which the chloroform was removed by stripping with hydrogen or nitrogen below atmospheric pressure and at about 100° C. Further purification consisted of repeated crystallizations from n-hexane and from acetone, which served to solidify the impurities rather than the desired end products. The final product was bleached with neutral, activated clay and activated carbon while in hexane solution.

We claim:

1. A process comprising diesterifying glycerol with a long-chain, aliphatic, monobasic, fatty acid containing from 12 to 22 carbon atoms to produce a reaction product comprising a mixture of the corresponding monoglyceride, diglyceride, and triglyceride, said mixture predominating in the diglyceride, isolating said diglyceride from the mixture, and then esterifying two moles of the diglyceride with one mole of an aliphatic, dicarboxylic acid selected from the group consisting of saturated and monoolefinic straight-chain, aliphatic dicarboxylic acids containing from 4 to 10 carbon atoms at a temperature of about 50° C. to produce the corresponding diglyceride diester.

2. The process of claim 1 wherein the monobasic fatty acid is stearic acid.

3. The process of claim 1 wherein the monobasic fatty acid is oleic acid.

4. The process of claim 1 wherein the dicarboxylic acid is adipic acid.

5. The process of claim 1 wherein the dicarboxylic acid is fumaric acid.

References Cited in the file of this patent

UNITED STATES PATENTS

| | | |
|---|---|---|
| 2,023,976 | Roberts | Dec. 10, 1935 |
| 2,205,111 | Vollweiler et al. | June 18, 1940 |
| 2,206,171 | Ellis | July 2, 1940 |
| 2,266,591 | Eckey et al. | Dec. 16, 1941 |
| 2,464,202 | Rust | Mar. 15, 1949 |